United States Patent [19]

Swars

[11] Patent Number: 5,054,334
[45] Date of Patent: Oct. 8, 1991

[54] ASSEMBLED DRIVESHAFT

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 581,065

[22] Filed: Sep. 6, 1990

Related U.S. Application Data

[63] Continuation of Ser. No. 307,413, Feb. 7, 1989, abandoned.

[30] Foreign Application Priority Data

Feb. 7, 1988 [DE] Fed. Rep. of Germany ....... 3803684

[51] Int. Cl.$^5$ ............................................. F16H 53/00
[52] U.S. Cl. ...................................... 74/567; 29/523; 29/888.08; 29/888.1
[58] Field of Search ............... 29/6.01, 888.08, 888.09, 29/888.1, 888.2, 523; 74/567, 595, 596, 597, 598, 607

[56] References Cited

U.S. PATENT DOCUMENTS 3,812,802  5/1974  Pierce .............................. 74/567 X
4,170,148 10/1979  Wolfe .............................. 74/567 X

FOREIGN PATENT DOCUMENTS 2232438   1/1974  Fed. Rep. of Germany .
2914657  10/1980  Fed. Rep. of Germany .
3530600   3/1987  Fed. Rep. of Germany .
1013625   7/1952  France ............................... 29/6
224747    7/1985  German Democratic Rep. .
107111    8/1980  Japan ................................. 29/6
189830    8/1986  Japan ................................. 29/6
2164420   3/1986  United Kingdom .

Primary Examiner—Timothy V. Eley
Assistant Examiner—Peter Dungba Vo
Attorney, Agent, or Firm—Toren, McGeady & Associates

[57] ABSTRACT

The invention relates to an assembled driveshaft and a process for production thereof in the case of which several tubular pieces and/or sleeves and a driving element to be attached thereon are inserted into each other and where, for forming the stepped hollow shaft and for fixing the driving element, the inner tubular portion of a region of overlap produced in the process, at least within the driving element, is expanded from the inside relative to the outer tubular portion and the driving element.

11 Claims, 1 Drawing Sheet

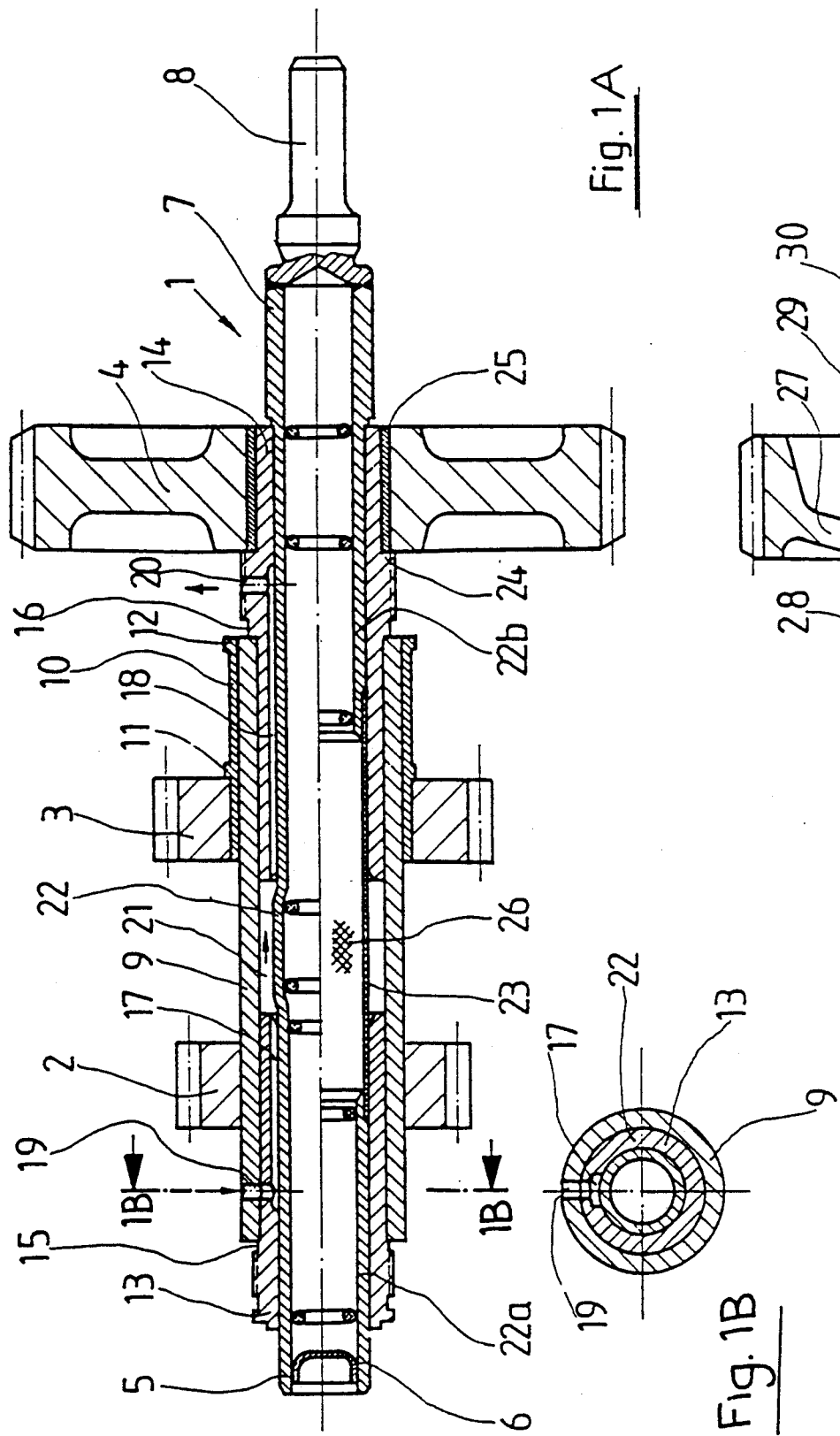
Fig. 1A
Fig. 1B
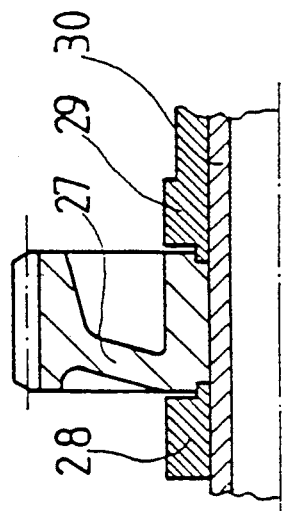
Fig. 2

ASSEMBLED DRIVESHAFT

This is a continuation applicalise of Ser. No. 07/307,413filed Feb. 7, 1989, now abandoned.

BACKGROUND OF THE INVENTION

The invention relates to an assembled driveshaft in the case of which individual drive elements, especially gears, are non-rotatably attached to a hollow shaft, with seat diameters being stepped in at least one direction. The invention additionally relates to a shaft produced in accordance with this process. Furthermore, the invention relates to a process for producing an assembled driveshaft and a device in the form of a pressurizing probe for carrying out the process.

Assembled driveshafts of the above type are known; in the case of these, hollow shafts are used for weight saving purposes. DE 34 25 600 refers to such a shaft which is expanded in a die so that a stepped shaft with different seat diameters for the driving elements is produced. The seat regions are designed in the shape of polygons on to which the driving elements are slid to ensure form-fitting engagement.

A further prior art process for producing such shafts includes reducing the diameter of the ends of an originally straight tube by elongating or hammering, thereby producing a similar hollow shaft containing stepped portions towards its ends. The seat portions for the driving elements being provided with teeth for attaching the driving elements in a form-fitting way, preferably by non-chip-producing forming operations. Furthermore, it is also known to produce a stepped hollow shaft with external teeth by internally expanding a tube in a die. The teeth required in the seat regions being produced directly during the course of the forming process. With this method, a stepped hollow shaft may be composed of several individual parts (DE 29 14 657 C2). The process described here requires an expensive die adapted to the individual workpiece, and because of the high forming rates involved, the amount of energy required is relatively high.

SUMMARY OF THE INVENTION

It is an object of the present invention to provide shafts of the above-mentioned type, especially a driveshaft for a mechanical gearbox, characterized by a lightweight design, fracture resistance and an advantageous vibration behavior It is an additional object to provide a process for producing such a shaft, which is suitable for products with the most varied shapes while requiring only minimum adaptation procedures and whose energy consumption is low. Even with complicated tube shapes it should not be necessary to carry out welding operations.

The objective is achieved in that the hollow shaft is composed of several tubular pieces and/or sleeves which are inserted into each other and which, in the region of their radial overlap, are connected to each other in an essentially force-locking way and that the driving elements are attached to respective tubular pieces and/or sleeves of the hollow shaft in an essentially force-locking way, with especially several tubular pieces and/or sleeves being inserted into each other. For forming the stepped hollow shaft, the inner tubular portion of a region of overlap produced in the process is expanded from the inside, especially for producing a force-locking connection.

For this purpose, uncomplicated straight tubular pieces which may be taken from standard material are inserted into each other with play and connected to each other progressively in a way known in itself from the larger inner diameters to the smaller inner diameters, i.e., as a rule from the shaft center to the shaft ends. Depending on the design of the tubular member, the joining sequence may be reversed, i.e., it may also progress in one direction or from the outside to the inside, which is not possible with a single-piece shaft. The driving elements which are to be attached to the shaft and which are preferably slid on in the region of overlap of two tubular pieces to the extent that they are subjected to higher torques are either attached in a further expansion operation—following the joining of the tubular pieces—by internal pressure application and expansion of the joined region or in one single joining operation in the case of which the tubular pieces inserted into each other are expanded jointly relative to the driving element.

In a preferred embodiment, outer tubular pieces or sleeves which at the same time serve as bearing regions of friction or roller bearings may be hardened and ground prior to being joined so that according to the preferred embodiment of the process, the expansion of the connected portions leads to the finished product. The tubular pieces or sleeves serving as seats for the driving elements or as bearing regions may, if necessary, already be machined in order to form axial stops for the driving elements or rolling members.

To the extent that internal expansion is mentioned for carrying out the processes this does not, as a rule, refer to a mechanical operation, but preferably, even if not exclusively, to an internal hydraulic pressure application which is axially limited to the regions of overlap of the tubular pieces or sleeves inserted into each other.

A device in the form of a pressure agent probe adapted to suit the invention may be designed for mass production purposes in such a way that it pressurizes different portions to be expanded simultaneously, with special measures of adaptation ensuring different pressure levels in the individual portions to be expanded, while maintaining the same prepressure in the pressure generator. A driveshaft in accordance with the invention produced in accordance with the above-mentioned process is characterized in that the hollow shaft is composed of several tubular pieces and/or sleeves which are inserted into each other and which through internal expansion of the respective inner tubular pieces in the region of the radial overlap are connected to each other essentially in a force-locking way. Additionally, the driving elements, through internal expansion of the respective tubular piece(s) or sleeve(s) on associated longitudial portions, are attached to the hollow shaft essentially in a force-locking way. The restrictive terminology of "essentially in a force-locking way" used in this context means that by suitable surface treatment and/or pressure application the force-locking connection of the smooth-faced parts may change into a material-locking connection, but nevertheless, when relieving the pressure after the joining operation a pretension and thus a certain amount of fore-locking is maintained.

In any case, suitable and advantageous results can be achieved if of several tubular pieces or sleeves inserted into each other, the respective inner one has the lowest yield point of the material and, in progressing stepwise outwardly, the respective outer one or driving element has the highest yield point of the material. In its first approximation this measure leads to optimum pressure/stress distributions and functionally efficient shafts for high torque values.

In a further embodiment, in the direction of torque flow, i.e., at one end or at both ends axially adjoining a driving element, sleeves are slid on to the tubular piece. In order to avoid an abrupt decrease in torsional strength the sleeves are attached to the tubular piece directly adjacent to the driving element in the same way. In this way the tube can be prevented from being subjected to torsion in the region directly adjoining the driving element and thus possibly the region underneath the driving element. The resulting micro-slip would lead to fit corrosion and reduce the strength of the connection. Because of the attached sleeves, this region of micro-slip is transferred to a protective element which itself is not torque loaded. An acceptable alternative consists in providing an extended seat region for the driving element which would embrace the sleeves in one piece.

As already mentioned above, a shaft embodiment with advantageous strength properties is characterized in that the driving elements are positioned in the region of the overlap of at least two tubular pieces or sleeves inserted into each other thereby achieving a certain clamping effect of the outer tubular piece between the inner tubular piece and the driving element. This is advantageous if the tubular piece clamped in this way is subjected to particularly high torque values. Needless to say it is also possible to have configurations in the case of which up to three tubular pieces or sleeves are positioned inside each other. Reasons other than strength considerations may decide in favor of such a configuration.

In yet another embodiment which has several advantages, a shaft whose outer diameter is stepped from the center towards the outside is provided with an inner tubular piece which extends over the entire shaft length. If two tubular pieces are inserted so as to be spaced into the ends of a central tubular piece with a larger diameter and joined to this outer tubular piece, with finally an inner continuous tubular piece inserted into these and forming the shaft ends at both ends while, through expansion, being joined to the two tubular pieces inserted first, there is produced a central cylindrical cavity which may have the function of guiding a lubricant. This applies in particular if in longitudinal portions in which tubular pieces overlap longitudinal grooves are provided over partial axial regions, which grooves are connected to the cylindrical cavity on the one hand and radial bores on the other hand.

The above design provides a further possibility in that the inner continuous tubular piece in the unsupported region within the cylindrical cavity is expanded once again or that the outer central tubular piece in the unsupported region outside this cylindrical cavity is rolled in, as a result of which one of the two tubular pieces is shortened relative to the other one. This results in a mutual tensile and compressive stress in the two tubular pieces which increases the bending strength and advantageously affects the vibration behavior.

According to a further advantageous embodiment the shaft ends may be formed by independent inner tubular pieces with possibly different diameters. Such a design is advantageous if the end pieces are required to have different diameters. Furthermore, there is a weight advantage as compared to the previously mentioned design without having to do without the advantages of lubricant supply. For this purpose it is advisable that, as previously, initially two shorter tubular pieces are inserted, so as to be spaced, into an axial central outer tubular piece with a larger outer diameter and joined to it through expansion and that subsequently, prior to inserting the inner tubular pieces forming the shaft ends, first a thin plate metal sleeve is inserted into these, which during the joining operation is clamped in between the radial central tubular pieces inserted first and the inner tubular pieces. In this case, too, the previously mentioned cylindrical lubricant cavity is produced.

If, with this design in particular, the plate metal sleeve should tend to be subject to vibrations, this can be avoided in an advantageous way by filling the shaft with a known plastic foam material available for such purposes, without causing any adverse effects on weight.

Further advantageous design possibilities are indicated in the drawing in which a preferred embodiment is illustrated.

BRIEF DESCRIPTION OF THE DRAWING

In the drawing:

FIG. 1A illustrates drive shafts with the upper half representing one embodiment and the lower half another;

FIG. 1B is a cross-section along the line 1B—1B in FIG. 1A; and

FIG. 2 is a partial view of a third embodiment.

DETAILED DESCRIPTION OF THE PREFERRED EMBODIMENTS

FIG. 1A shows a hollow shaft 1 to which three driving elements 2, 3, 4 are attached. Whereas one actually open shaft end 5 is closed by a pressed-in plate metal cover 6, a solid journal 8 has been welded on to the second open shaft end 7. Looking at the shaft as the production process proceeds, it initially consists of an axially central outer tubular member 9 to which the driving elements 2 and 3 are attached by expanding the tubular portion. Prior to fixing the driving element 3, a sleeve 10 has been slid on to the tubular portion 9, which sleeve, with one end, extends underneath the driving element 3 and with a further portion, between two collar regions 11, 12, serves as a roller bearing track. It is possible, in a first expansion operation, to fix the sleeve 10 by expanding the tubular piece 9 along its length and subsequently to fix the driving element 3 by again expanding a partial region. But it is also possible to fix the sleeve 10 and the driving element 3 to the tubular piece 9 simultaneously by expanding the latter only underneath the driving element or along the entire sleeve length.

Two further tubular pieces 13, 14 of a smaller diameter have been inserted into the tubular piece 9 and have radial steps 15, 16 so as to be able to rest against the end faces of the tubular member 9. These tubular pieces 13, 14, in turn, may be connected in a force-locking way to the tubular piece 9 through internal hydraulic expansion in the regions of overlap with the tubular piece 9. As in the case of the sleeve 10, this operational step may simultaneously serve to connect the tubular piece 9 to the driving elements 2 and 3 or, in terms of time, it may follow the previous operation of joining these parts. In the section illustrated in FIG. 1B, too, the tubular pieces 13, 14 have longitudinal grooves 17, 18 which are in contact with radial bores 19, 20 which, in the first case, also pass through the tubular piece 9 and which are connected to each other via a cylindrical space 21 whose production will be explained below. The cylindrical space 21 is produced in that a continuous inner tube 22 is inserted into the tubular pieces 13, 14, which continuous inner tube 22 at the same time forms the shaft ends 5, 7. The inner tube 22 is connected to the tubular pieces 13, 14 in a force-locking way as described on several occasions above.

In the lower half of FIG. 1A it can be seen that the shaft ends 5, 7 are formed by shorter inner tubular pieces 22a, 22b and that prior to inserting these inner tubes a plate metal sleeve 23 is first inserted into the central tubular pieces 13, 14, which after the tubular pieces 22 have been joined is clamped in with its end regions between these and the central tubular pieces. In this case, the plate metal sleeve 23 serves to form the cylindrical cavity 21. Furthermore, the driving element 4 has been slid on to and fixed to the outwardly free region of the tubular piece 14, with a radial step 24 again serving as an axial stop. Again, the connection between the inner tube 22 and the central tube 14 may be effected prior to fixing the driving element 4 or simultaneously with the latter process. To achieve the necessary strength, a steel sleeve 25 may be cast into the driving element 4 consisting of a cast material. In the tube interior, O-rings arranged in pairs as illustrated by crosses indicate possible regions of expansion. It can be seen that the inner tubular member 2 can be expanded in the central unsupported region in such a way that it is shortened relative to the outer tubular member 9, so that in the two tubular members there remains a tensile and compressive stress which increases the bending strength and advantageously changes the vibration behavior. In the lower half of FIG. 1A there is indicated a damping material 26 which can also improve vibration characteristics.

The detail FIG. 2 refers to a simple tubular piece 30 where directly following a driving element 27 in the axial direction, two sleeves 28, 29 are slid on and fixed in the same way as the driving element 27. This design prevents a disadvantageous decrease in torsional strength directly at the driving element and avoids micro-slip at this point.

While the invention has been illustrated and described as embodied in an assembled driveshaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. An assembled driveshaft, comprising: a hollow shaft; individual drive elements, said drive elements are non-rotatingly attached to said hollow shaft, with seat diameters being stepped in at least one direction, said hollow shaft being composed of several tubular members which are telescopingly connected to each other in an essentially force-locking way in a region of their radial overlap so that said hollow shaft has a stepped outer diameter, said drive elements being attached to respective of said tubular members of said hollow shaft in an essentially force-locking manner, a respective innermost one of said tubular members having a lowest yield point of the shaft material and, progressing stepwise outwardly, one of a respective outermost of said tubular member and drive element having a highest yield point, one of said drive elements being at least partially positioned in the region of the overlap of at least two tubular members inserted into each other, and the driving elements being made of a material having a yield point higher than a yield point of the material of the respective tubular member attached underneath of said driving elements.

2. The shaft according to claim 1, wherein said several tubular members include a tubular piece, and further comprising sleeves slid onto said tubular piece in a direction of torque flow at at least one end so as to axially adjoin a driving element, said sleeves being attached to said tubular piece which is attached directly adjacent to the driving element so as to avoid an abrupt decrease in torsional strength.

3. The shaft according to claim 1, wherein said several tubular members include an inner tubular piece extending along the entire shaft length.

4. The shaft according to claim 1, wherein said several tubular members include independent inner tubular pieces provided so as to form ends of said shaft.

5. The shaft according to claim 4, wherein said independent inner tubular pieces have different diameters.

6. The shaft according to claim 1, wherein said several tubular members include individual tubular pieces having at least one of inner and outer longitudinal grooves provided therein so as to extend across axial portions and connect to radial bores to serve as lubricating channels.

7. The shaft according to claim 1, wherein said several tubular members include an outer tubular piece, a plurality of tubular pieces inserted into said outer tubular piece and attached at a distance from one another and one of said tubular piece and a sleeve are inserted into said outer tubular piece and are attached by further tubular pieces so as to provide a cylindrical cavity for lubricant guiding purposes therebetween.

8. The shaft according to claim 7 wherein the cylindrical cavity is connected to at least one of longitudinal grooves and radial bores of said tubular members for lubricant guiding purposes.

9. The shaft according to claim 1, wherein said several tubular members include sleeves slid on and attached to a plurality of tubular pieces so as to form as bearing regions.

10. The shaft according to claim 9, wherein the sleeves are inserted into adjoining driving elements and are attached together with said driving elements on said tubular members.

11. The shaft according to claim 1, wherein said tubular members include at least one of tubular pieces and sleeves.

* * * * *